United States Patent [19]

Still

[11] 4,302,757

[45] Nov. 24, 1981

[54] BORE TELEMETRY CHANNEL OF INCREASED CAPACITY

[75] Inventor: William L. Still, Purcellville, Va.

[73] Assignee: Aerospace Industrial Associates, Inc., Purcellville, Va.

[21] Appl. No.: 37,318

[22] Filed: May 9, 1979

[51] Int. Cl.³ .............................................. G01V 1/40
[52] U.S. Cl. .................................... 340/854; 340/857; 455/40; 455/41; 370/21; 375/6; 375/24; 375/39
[58] Field of Search ................................ 340/853–856; 367/82; 455/40, 41; 375/39, 54, 6, 24; 370/19, 20, 21

[56] References Cited

U.S. PATENT DOCUMENTS

| | | | |
|---|---|---|---|
| 3,079,549 | 2/1963 | Martin | 340/853 |
| 3,588,702 | 6/1971 | Tisi et al. | 375/39 |
| 3,967,201 | 6/1976 | Rorden | 340/854 |
| 4,057,781 | 11/1977 | Scherbatskoy | 340/853 |
| 4,087,781 | 5/1978 | Grossi et al. | 340/854 |
| 4,123,710 | 10/1978 | Stuart et al. | 375/39 |

*Primary Examiner*—Howard A. Birmiel
*Attorney, Agent, or Firm*—Larry S. Nixon

[57] ABSTRACT

Apparatus and method for signaling within a drill hole without disturbing an ongoing drilling operation. High data rates are achieved by using phase and/or amplitude modulation techniques which enable information transfer rates well in excess of the data bit rates being transmitted. The modulation technique provides a multi-level signal which makes optimum use of the amplitude/phase space available. The ability of the invention to substantially increase the carrying capacity of the communication channel is based upon the dispersive characteristics of electromagnetic propagation in a bore hole, wherein the lower frequencies propagate at a slower velocity, and with less attenuation than the higher frequencies. The relative effects of losses over the path length and the added signal-to-noise ratio required for the modulation techniques disclosed in this invention are balanced against each other in such a manner that data rates otherwise achievable only at higher frequencies can be obtained at lower frequencies with a net increase in usable path lengths for equivalent available signal powers and data rates. In accordance with this invention the number of signal states, e.g. phase levels and amplitude levels, for a given signal frequency are selected so as to maximize either the signal path length for a given carrying capacity of the signal channel, or the carrying capacity of the channel for a given path length.

28 Claims, 10 Drawing Figures

BORE TELEMETRY CHANNEL OF INCREASED CAPACITY

FIELD OF THE INVENTION

The invention generally relates to an electromagnetic communication channel in a drill hole and more particularly to a method and apparatus for transferring binary digital data using low frequency carrier waves and multilevel modulation (other than frequency modulation). The invention is applicable to any task which includes the requirement to transmit information from any point within a drill hole to the surface; from the top of the drill hole to any point, or plurality of points, within the drill hole; and between any plurality of points within the drill hole. It is particularly applicable to the transmission of data while drilling is in progress, from sensors located within the drill hole, and attached to the drill string.

BACKGROUND OF THE INVENTION

It has been found very helpful to drillers to be able to obtain environmental data and data regarding the operation of the drill bit and drill string while drilling is ongoing. However, the problem of obtaining information from the bottom of a drill hole which is often a narrow, curved hole extending a mile or more into the earth, is a formidable one. The mechanical shocks and other stresses created during drilling among other factors make the use of an insulated communication path along the drill string impractical. The physical environment and depth of drill holes also limits the power input for communications which may be established therein. A number of techniques and devices have been proposed for achieving the transfer of data from within the drill hole to the surface, without the use of separate conducting cables. For example, Silverman in U.S. Pat. No. 2,354,887 proposes the use of a toroid which surrounds the drill string. Alternating circuit introduced into the winding of the toroid produces a magnetic flux in the core of the toroid with the earth acting as the return path to complete a current loop between points on the drill string above and below the toroid. A variety of techniques are used at the surface to measure the drill string currents thus produced. One of these techniques includes a second toroid surrounding the drill string at the surface. A portion of the current introduced into the drill string also flows through this second toroid and thereby produces a measurable voltage at the output terminals of the second toroid as will be apparent to those skilled in the art. Silverman, as well as other prior bore hole telemetry systems, are concerned only with the gross aspect of the signal path, and are either silent as to what modulation techniques are to be employed, transmit pure analogue signals or assume conventional binary digital data transmission. Silverman discloses a means for transmitting analogue data either by modulating a single carrier frequency or by frequency modulation. Silverman does not transmit digital data, and suggests frequency modulation as being preferable to amplitude modulation in transmitting data regarding formations in the earth.

A serious problem with the transmission of electromagnetic data along the drill string as suggested by Silverman is that due to the dispersive character of the earth, current does not simply flow in a single loop along the drill string through the toroids and return through the earth. A theoretical paper, "Theory of Transmission of Electromagnetic Wave Along a Metal Rod in a Conductive Medium," by James R. Wait and David A. Hill, Institute of Telecommunications Sciences, Office of Telecommunications, U.S. Department of Commerce, indicates that the one turn toroid model is an over-simplification; that actually the current exists as an electromagnetic wave loosely coupled to the drill string. According to Waite et al, the principal attenuation mechanism is such that the current on the drill string can be approximated by the equation $$I_{(d)} = v_o(B[\sigma, f, d]e^{-d/\delta})$$

where:
- $I_{(d)}$ = the current on the drill string as a function of distance (d) from the toroid;
- $v_o$ = the initial voltage excited in the drill string by the toroid;
- $B[\sigma, f, d]$ = a general variable term which varies with earth conductivity, $\sigma$, the frequency, f, and the distance, d;
- $\delta$ = the skin depth formula, conventionally used in computation involving a conductive earth where $\delta \simeq 500/\sqrt{\sigma f}$ meters The terms $B[\sigma, f, d]$ and $e^{-d/\delta}$ are the variable terms in the formula. However, the latter exponential term is so predominant that for many purposes, the terms $B[\sigma, f, d]$ can be either neglected or considered as a constant.

This theory therefore indicates that to an approximation the attenuation of current in the drill string increases exponentially with distance, frequency and the conductivity of the earth. Since with binary digital data transmission the data rate, and hence the information bandwidth, is keyed to the frequency used for transmission, lower signal frequency inherently results in a lower data rate. When conventional binary digital data transmission is applied to bore hole telemetry as in the case of Silverman, the result is that with limited communications power input, and the drilling depths and conductivities of interest to petroleum drilling, the frequency must be so low that insufficient data rate can be achieved.

One proposed solution to this problem is suggested in U.S. Pat. No. 3,793,632 issued to Still. Still suggests increasing the operating depth, and/or the achievable data rate possible with the telemetry system of Silverman by using a plurality of repeaters along the bore hole and communicating between adjacent repeaters with noninterfering modes. However, in order to obtain adequate data rates to meet the needs of petroleum drilling and the like using binary digital data transmission, it is necessary that the path lengths between repeaters become so short that the number of repeaters could make the technique economically unattractive.

SUMMARY OF THE INVENTION

In accordance with the present invention, an apparatus and method for telemetering digital data between two points in a bore hole are provided, which method and apparatus utilizes multilevel modulation (other than frequency modulation) of mutually orthogonal carrier frequency waves to generate low frequency, narrow bandwidth electrical signals which are transmitted along a drill string. A receiver at a second point along the bore hole is electrically coupled to the drill string for receiving and demodulating the electrical signals. The use of low frequency mutually orthogonal carrier waves modulated by the technique taught in this invention enables many binary information bits to be encoded on a single low frequency carrier wave. This enables exploitation of the dispersive characteristic of the path as reflected by the exponential terms of Wait's equation. By use of this invention, it is possible to transmit at extremely low frequencies (on the order of 0.5 to 1 Hz). This permits the use of a longer transmission path and/or a faster transmission rate than is possible using conventional binary digital data transmission for a given power input. The loss of data rate which occurs by going to a very low frequency signal is compensated for by encoding many binary bits on a limited time segment of a single low frequency carrier wave (hereinafter "an information cycle"). In this manner, over a very wide range of variables, the information rate needed for useful transfer of information is decoupled from the frequency upon which it is transferred.

The use of these modulation techniques involves a penalty, in that signal-to-noise ratios higher than those used for conventional binary digital data transmission are required. However, the dispersive characteristics of the earth reflected by the exponential term in the Wait equation are so strong that it is possible to pay the penalty in signal-to-noise ratio, and, by going to a lower frequency, more than recoup the signal strength required to both increase data rate, and increase usable path length.

There are many forms of modulation which could be used in accordance with the present invention without increasing the signal frequency or bandwidth. The two simplest and most obvious are phase and amplitude modulation. Either of these two methods could be used separately but by using them together it is possible to double the information rate without any additional penalty in signal-to-noise since, as is well known in the art, phase and amplitude errors are generally not correlated. The philsophy of dual parameter modulation, e.g. amplitude/phase modulation, can be carried even further if two orthogonal carrier frequencies are also used. For example, splitting power equally between two adjacent orthogonal frequencies (e.g. 1 Hz and 2 Hz) costs only 6 dB. Thus, added capacity can be provided by using two or more orthogonal frequencies, each modulated with either or both phase and amplitude modulation. The 6 dB penalty is less than the penalty which would be expected for an additional bit of encoded information when the orthogonal matrix technique utilized in the first embodiment discussed below is utilized. This added gain can be improved even more by recognizing that these frequencies will have different path attenuations. Thus, the frequency with less attenuation can receive proportionately less power in the higher frequency.

In accordance with one exemplary embodiment of the invention, sensor-transducers located near the drill bit of a drill string feed binary data to a transmitter. The transmitter is in turn coupled to a toroid which surrounds the bit end of the drill string and causes electrical signals to be transmitted along the drill string to a receiver at the surface of the drill hole. In the transmitter of the exemplary embodiment, binary digital data is encoded to a higher number base, the modulus of the higher number base being selected on the basis of the number of unambiguous, independently identifiable phase and amplitude states which can be represented in the amplitude/phase base defined by the transmitted signal and received and identified by the receiver in the noise environment of the system.

Under these teachings, the modulus of the transmitted signal vector, defined in phase and amplitude, can be any number. However, from practical considerations the preferred system will select number bases of moduli two the nth power. This family of moduli are readily implemented by available digital hardware and will thus create less design, and interfacing problems.

The present invention could also be utilized as an improvement of the bore hole telemetry system described in the prior patent issued to Still, U.S. Pat. No. 3,793,632. In U.S. Pat. No. 3,793,632, a plurality of repeaters are utilized at intervals along a drill string to transmit data within a drill hole, with the repeater input and output being in orthogonal noninterfering modes, only the output of each repeater and the input of the next repeater being required to be of the same mode. If the present invention were applied to the invention described in U.S. Pat. No. 2,793,632, the modes could alternate in successive order, for example, among a first carrier cosine wave of a first frequency, a second carrier cosine wave of a second frequency and a third carrier sine wave of the first frequency, as one moves up the drill string.

BRIEF DESCRIPTION OF THE DRAWINGS

A more complete understanding of this invention and appreciation of its improvements and advantages may be obtained from the following detailed description and accompanying drawings, of which.

DETAILED DESCRIPTION OF THE PREFERRED EMBODIMENT

Figure 1:
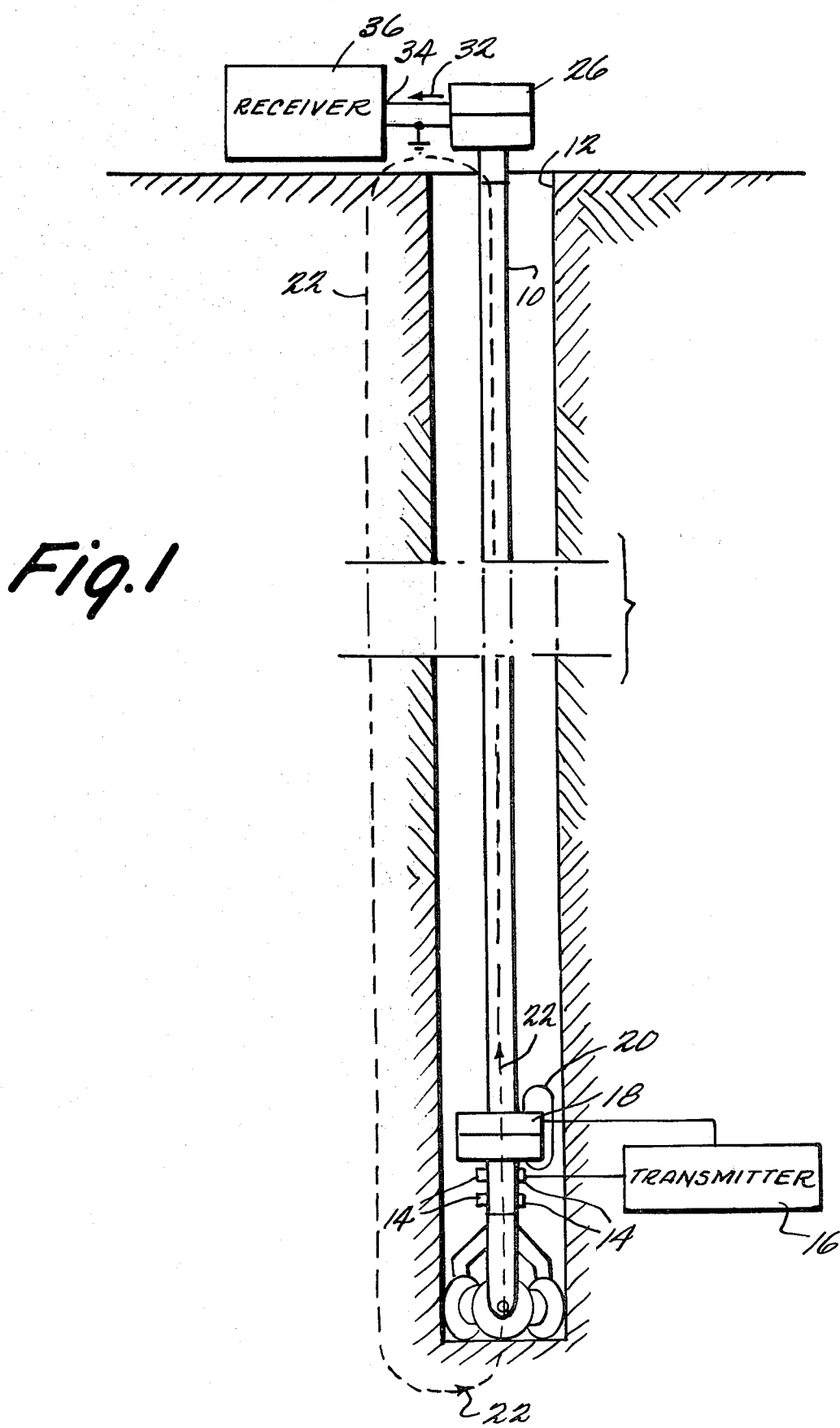
FIG. 1 is a diagrammatic view of a first exemplary embodiment of this invention actually in use in a drill hole.

Referring to FIG. 1, a drill string 10 disposed in a drill hole 12 has at the bottom end thereof sensor/transducers 14 which feed binary data to transmitter 16. Transmitter 16 generates low frequency signals which are modulated by multilevel modulation (other than frequency modulation) means responsive to the output of sensor/transducers 14, as will be described. A toroid 18 surrounds the drill string at its lower end and is connected at its input to the output of transmitter 16. Toroid 18 is suitably identical to the toroid (coil wound around a core which surrounds the drill string) illustrated in FIG. 2 and described at lines 34–46 of the left hand column on page 2, of U.S. Pat. No. 2,354,887 issued to Silverman. Toroid 18 causes a magnetic flux 20 to encircle drill string 10 and cause a current 22 to flow vertically along the drill string 10 (subject to attenuation and frequency dispersion as has been previously described). Current 22 in drill string 10 continues to the top of drill hole 12 where it is grounded, the return path of the current to the bottom tip of the drill string being through the earth. Surrounding drill string 10 near the top surface is a second toroid 26. Toroid 26 may be the same as the toroid at the top of the drill string illustrated in FIG. 5 and described at page 4, left hand column, lines 5–8 of Silverman. Current 24 passes through toroid 26 causing a signal 32 to be generated therein. Signal 32 is fed to the input 34 of receiver 36. Receiver 36 demodulates signal 32 as will be described.

The illustrative transmitter and receiver shown in FIGS. 2–5 use phase and amplitude modulation to produce a 12 bit per information cycle, modulo 4096 number. These numbers are selected because it appears to be close to the optimum data compression for achieving maximum path length/data rate as will be discussed.

Figure 2:
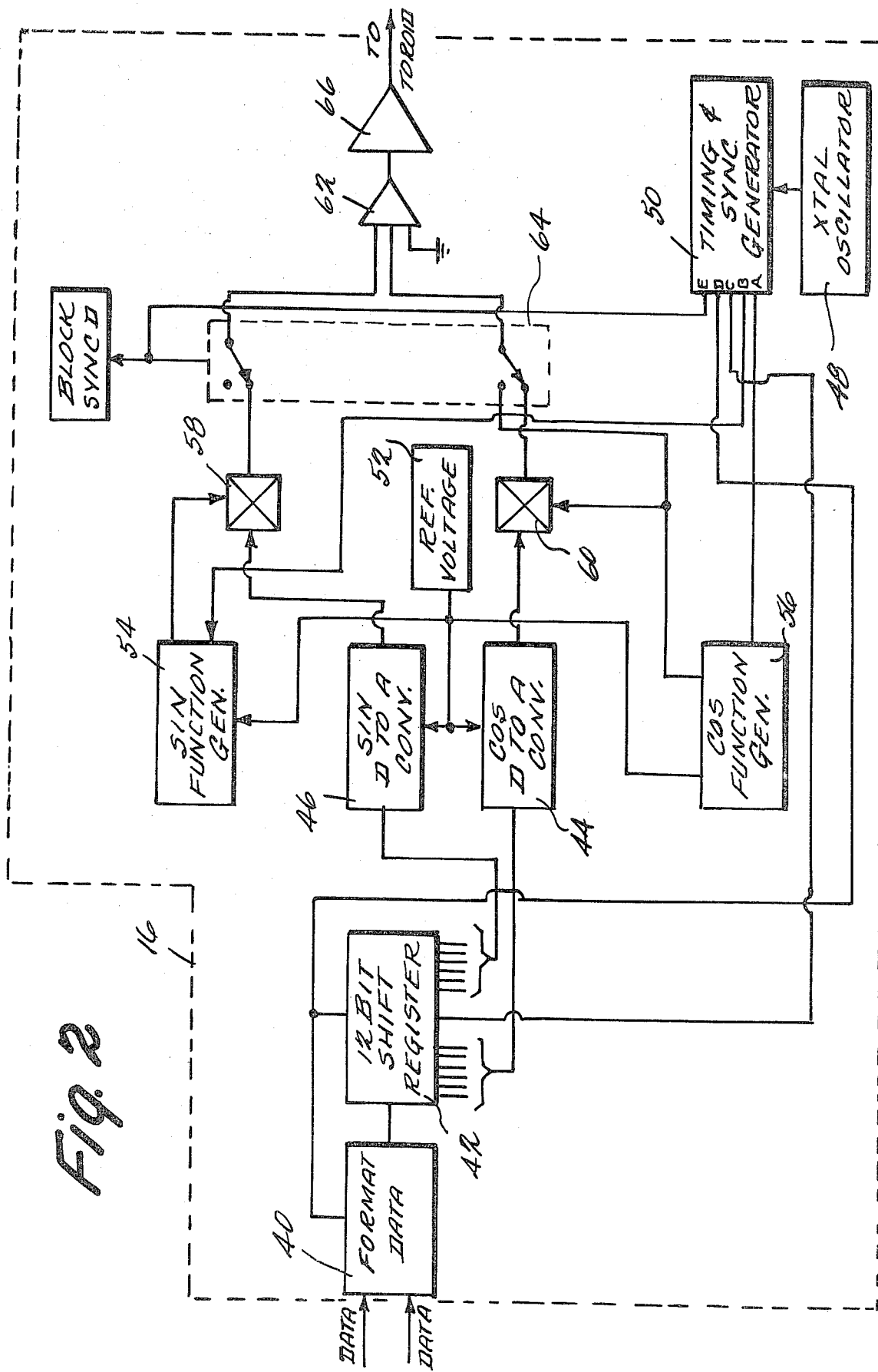
FIG. 2 is a schematic diagram of the transmitter shown in FIG. 1.
Figure 3:
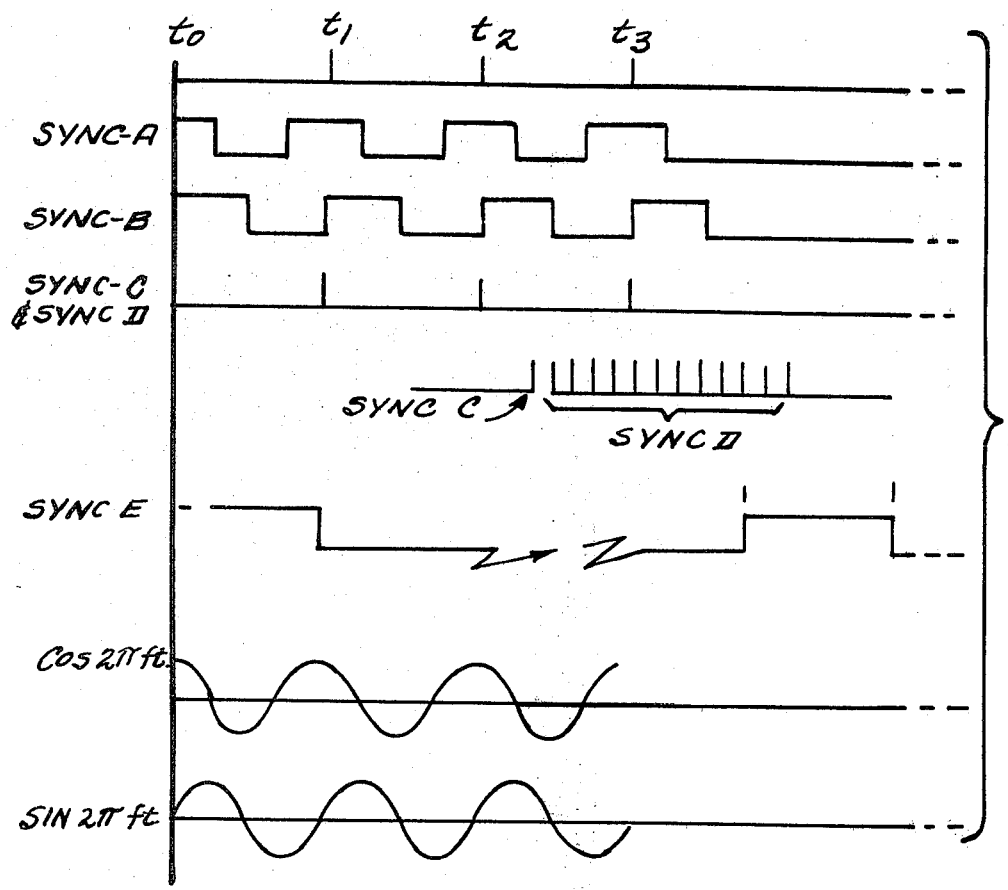
FIG. 3 shows the timing diagram for the transmitter diagrammatically illustrated in FIG. 2.

FIG. 2 shows an illustrative embodiment of the transmitter 16. FIG. 3 shows the timing of the sync signals and the carrier signals generated in the transmitter. Referring now to FIGS. 2 and 3, data enters the system through the data formatter 40. Data is clocked out of format storage by Sync D which consists of a very short burst of 12 pulses. The duration and separation of these pulses is not critical, except that the total duration of the Sync D pulses should be negligibly short with respect to the frequency being transmitted as is illustrated in FIG. 3. The 12 Sync D pulses cause 12 binary bits of data to be read into the 12 bit shaft register 42. The twelve data bits in register 42 are split into two groups of six data bits, one group going to cosine digital to analogue converter 44, the other group going to sine digital to analogue converter 46. It should be noted that the order, sequence or arrangement of the bits within the group is not important, so long as the corresponding order, sequence or arrangement of bits is maintained on decoding at the receiver end, for example. In the embodiment shown in FIG. 2, the most significant bits go to Cosine Converter 44 while the least significant bits go to sine converter 46. The bits could just as well have been split with all odd numbered bits going to one converter and all even numbered bits going to the other converter.

The timing of the operation is under the control of crystal oscillator 48 and the timing and synchronization generator 50. Up to the inputs of digital to analogue converters 44 and 46, the operation is entirely digital. From the outputs of converters 44 and 46, transmitter's operation is strictly analogue. Thus, the voltage reference 52 must be of high accuracy and stability. Sine and cosine components of the frequency to be transmitted, $f_o$, are generated by diode function generators 54 and 56, which receive cosine (reference) square waves, Sync A, and the 90° phase shifted (sine) square wave, Sync B, and convert them to sine and cosine waves at the reference voltage amplitude, and the frequency to be transmitted $f_o$. The sine and cosine wave outputs of generators 54 and 56 are respectively fed to input terminals of analogue multipliers 58 and 60. Also input to these multipliers are the respective outputs of the Digital to Analogue converters 44 and 46, scaled to the reference voltage 52. In multiplier 58 the analogue equivalent of the binary number input to converter 44 is multiplied by a voltage proportional to Cos $2\pi$ ft. In multiplier 60, the analogue equivalent of the binary number input to converter 46 is multiplied by a voltage proportional to Sin $2\pi$ ft. The amplitude modulated sinusoidal waves are combined in amplifier 62, to form a phase and amplitude information at the output of amplifier 62. The combined phase and amplitude information in the wave at this point is unique to the one of the 4096 states defined by the 12 bit number in shift register 42.

The process lasts through one cycle from the leading edge of one Sync B wave to the next positive going edge of Sync B. At the same time as the leading edge of Sync B a short pulse Sync C is initiated which causes shift register 64 to reset, and is closely followed by Sync D, and the process repeats. In accordance with the present embodiment of the invention the transmitter operates at one cycle per 12 binary bit information cycle. The generality of these teachings however would not be diminished if the transmitter were operating at any number of cycles per information cycle. However, such operation would decrease the penetration distance available for a fixed data rate and power.

The goal of this process is to make maximum use of the phase/amplitude space available in the signal. Thus, the transmitted data contains almost no a priori data of the type normally used to enable the receiver to lock onto the transmitted data. Thus it is necessary to periodically transmit a known amplitude and phase reference in a known time slot. This is accomplished by Sync E. Sync E is shown in FIG. 3 as occurring every sixteenth cycle of the system. This periodicity is illustrative only. Under rapidly changing conditions, Sync E may have to be transmitted as often as every other cycle. Under very stable conditions the productivity of Sync E could possibly be extended to intervals greater than 16 cycles. As is schematically illustrated in FIG. 2, Sync E blocks Sync D so that the data normally transmitted during that period is not lost. It also causes analogue switch 64 to activate. This disconnects the outputs of multipliers 58 and 60 from amplifier 62 and connects the diode function generator 56, whose output is a pure cosine wave having a reference voltage amplitude, to amplifier 62. This provides a reference amplitude and zero phase for the receiver. At the conclusion of one cycle Sync E terminates and the system reverts to normal data transmission.

The output of amplifier 62 is used to drive linear power amplifier 66. The output of 66 is coupled to the primary of a toroid as disclosed by Silverman in U.S. Pat. No. 2,354,887 and thence couples to the drill string as discussed above.

Figure 5:
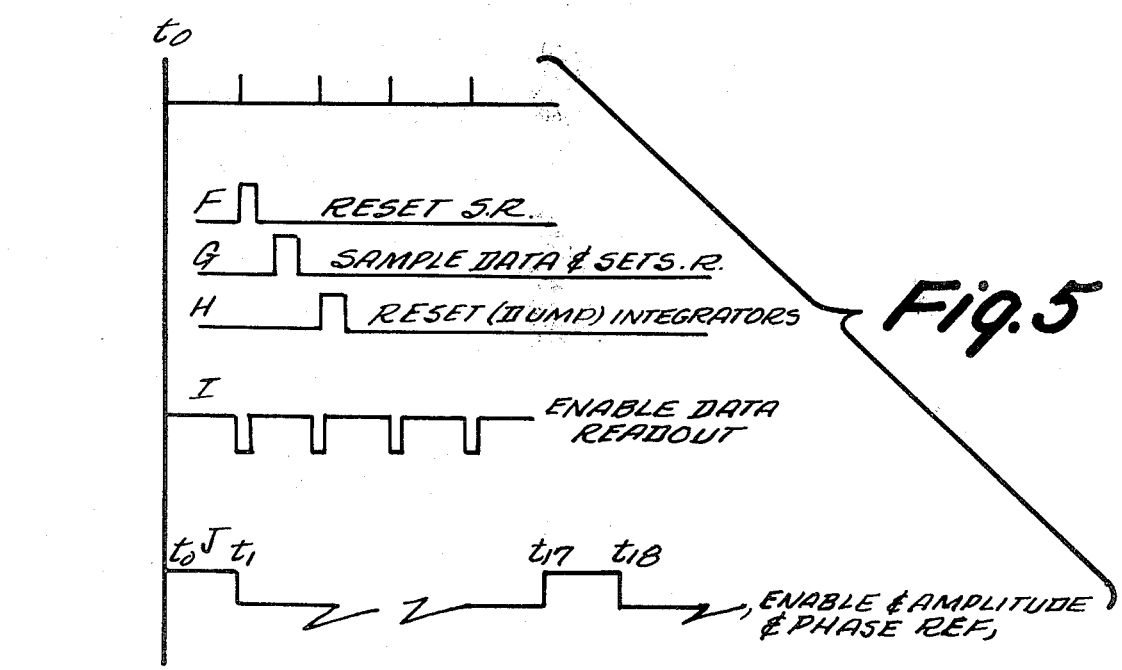
FIG. 5 shows the timing diagram of the receiver schematically illustrated in FIG. 4.
Figure 4:
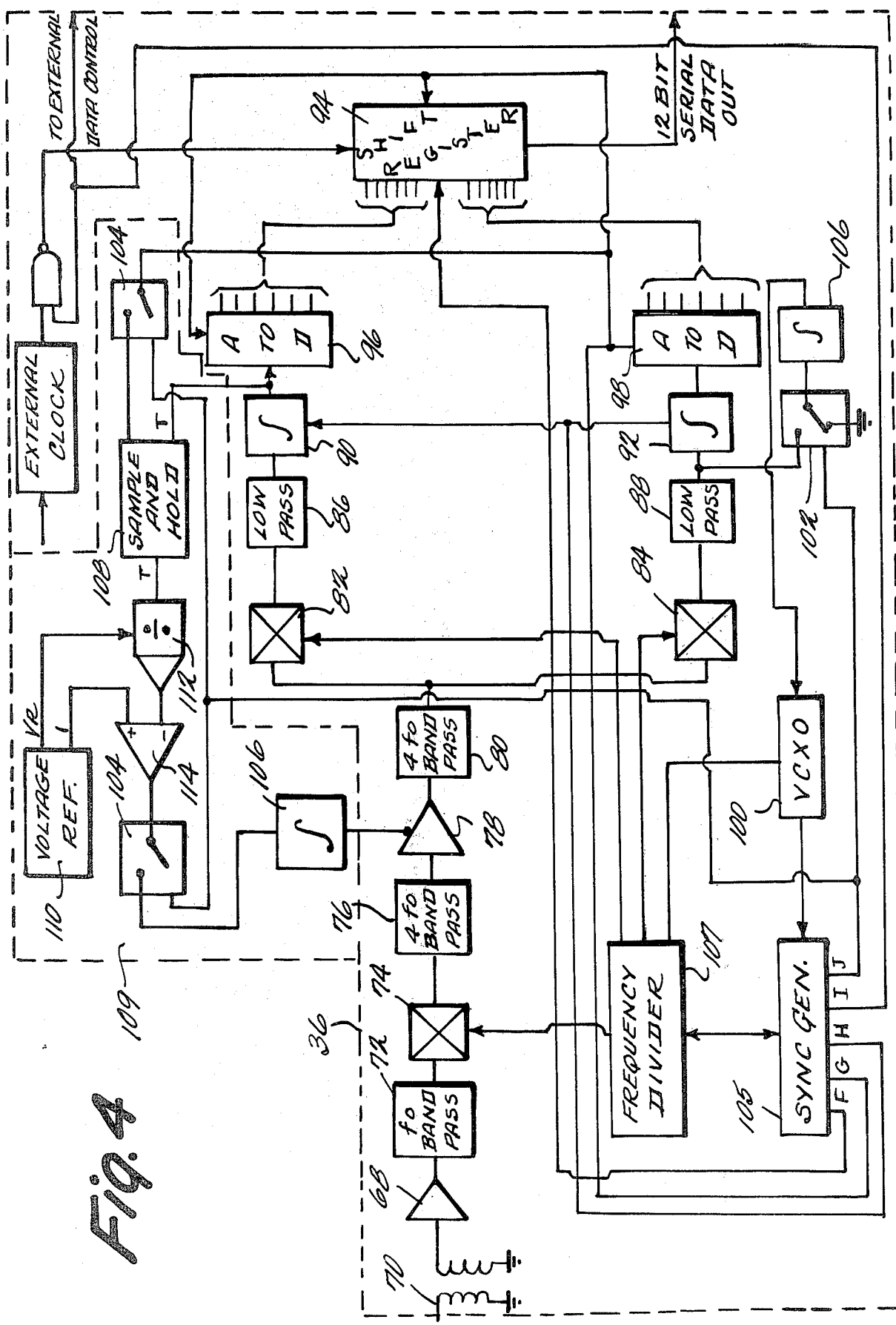
FIG. 4 is a block diagram of the receiver shown in FIG. 1.

Referring now to the receiver flow diagram of FIG. 4, and its accompanying synchronization diagram in FIG. 5, the signal received from the second toroid 26 is coupled into preamplifier 68 through step up transformer 70. The primary of transformer 70 is coupled to the windings of toroid 26. The purpose of transformer 70 is to convert the weak current source in toroid 26 to a voltage, and to raise this voltage above the input noise of the front end of preamplifier 68. Preamplifier 68 is a high gain low noise preamplifier. Typical gains for the combination of preamplifier 68 and transformer 70 range from 60 to 80 dB. The output of preamplifier 68 is filtered in band pass filter 72, entered at the carrier frequency $f_o$. Care must be taken to ensure that none of the amplifiers saturate in the amplification process. At the output of filter 72 the frequency $f_o$ of the signal is converted to a higher frequency, $4f_o$, by multiplying it in analogue multiplier 74, by $3f_o$. The output of multiplier 74 is the sum and difference frequencies of the two inputs, i.e., $2f_o$ and $4f_o$. The purpose of this conversion is to avoid the need to locally generate $f_o$ during the subsequent synchronous process. The higher frequency $4f_o$ is selected as the intermediate frequency to provide better noise rejection. The output of multiplier 74 is further filtered in bandpass filter 76, amplified in variable gain amplifier 78 and again filtered in bandpass filter 80. The output of filter 80 is synchronously detected to separate the sine, and cosine components of each information cycle. This is accomplished by multiplying the output of filter 80 by $4f_o$ at a phase angle, which angle is initially arbitrarily defined as zero phase, in analogue multiplier 82. In addition, the output of filter 80 is multiplied in analogue multiplier 84 by a sinusoid which is in phase quadrature to that applied to multiplier 82.

The outputs of multipliers 82 and 84 are passed through their respective low pass filters 86 and 88 to remove those cross modulation components at other than zero frequency generated in the multiplication process in multipliers 82 and 84. The outputs of filters 86 and 88 are then integrated over the information cycle in integrate and dump filters 90 and 92 to produce analogue output signals. At the conclusion of the information cycle, Sync F resets 12 bit shift register 94 to zero and Sync G causes A to D converters 96 and 98 to sample and hold the integrated analogue outputs of filters 90 and 92. Converters 96 and 98 convert the analogue inputs from filters 90 and 92 to digital format, and sets the digital numbers into shift register 94, in the same format as they were read out of shift register 42 in the transmitter. Sync H then dumps (resets to zero) integrators 90 and 92 and the cycle repeats.

Crystal oscillator 42 and voltage controlled crystal oscillator 100 should be sufficiently near to the same frequency that over the interval between reference pulses they differ little in either phase or frequency. They should be initially aligned so that the reference pulse caused by Sync E and reference sampling gate caused by Sync J are coincident. If this cannot be guaranteed, there are many well known search and lock circuits which could be incorporated to accomplish the same result.

Low pass filter 88 is also connected to integrator 106 through switch 102. Every 16th information cycle when receiver 36 receives a reference signal from transmitter 16, Sync J having zero phase causes analogue switches 102 to activate for one information cycle. Since the transmitted phase is zero during the period of Sync J, any signal at this time is indicative of a phase error. This error is integrated in integrator 106 and applied to the voltage converter of voltage controlled crystal oscillator 100 whose output is connected to sync generator 105 and frequency dividers 107. The output of oscillator 100 corrects the frequency output of Frequency dividers 107 as is well known in the art. This correction is reflected through the frequencies derived in filter 88 to cause an overall phase correction. Sync J also activates the voltage reference correction circuit 109 through analogue switch 104 which is a 2-pole switch. The input to analogue to digital converter 96 is connected to the input of sample and hold circuit 108 and provides a sample voltage T thereto. Current 108 is controlled by Sync G through switch 104. The output of sample and hold circuit 108 is connected to the denominator terminal of analogue divider 112. The numerator terminal of divider 112 is connected to voltage reference 110 which provides a voltage $V_R$ thereto. The output of divider 112, $V_R/T$, is subtracted from 1 volt in operational amplifier 114. The output of operational amplifier 114 controls voltage controlled amplifier 78 through switch 104 and integrator 106. Thus when Sync J closes switch 104 the next Sync G signal activates sample and hold circuit 108 to sample Converter input T. Divider 112 and amplifier 114 forms a signal $1-V_R/T$ which is integrated over one cycle of Sync G by integrator 106 to control the gain of amplifier 78. Since the output of integrator 106 is the integral of $(1-V_R/T)$, the gain of amplifier 78 will continue to change until $(1-V_R/T)=0$ which is its only stable condition. In this manner, the gain of amplifier 78 is adjusted to provide constant voltage response to the reference signal.

The data is shift register 94 can be clocked out by external clock 118 in response to the highs of Sync I. Sync I is high except while the next data bits are being integrated in integrators 90 and 92.

It should be noted that the receiver circuit in FIG. 4 is an exemplary embodiment only. It may not be optimum. In actual practice the majority of the gain and phase control functions could be under computer software control. Thus much more sophisticated algorithms to stabilize this sampled data control could, and probably would be applied.

To this point the teachings have included the use of multilevel modulation at a single frequency. It is apparent that further improvements can be obtained by applying these same techniques to a plurality of frequencies. If more than one frequency is used, the dispersive characteristics of the earth are such that the majority of the available power must be concentrated in the higher frequencies. Thus lower, noninterfering frequencies, also subjected to multilevel modulation, can be transmitted simultaneously with little added penalty. The limit on the use of multiple noninterfering frequencies would be based upon the availability on noninterfering modulation bandwidth below that used by the higher frequencies. There are cases where because of some of the adverse effects of the dispersive path it may be necessary to operate at several cycles per information cycle. This will result in loss of data rate. Under these conditions, the use of a number of cycles per information cycle and a plurality of noninterfering frequencies will more effectively use the available bandwidth and at least recoup the data rate lost by operating at more than one cycle/information cycle.

Figure 6:
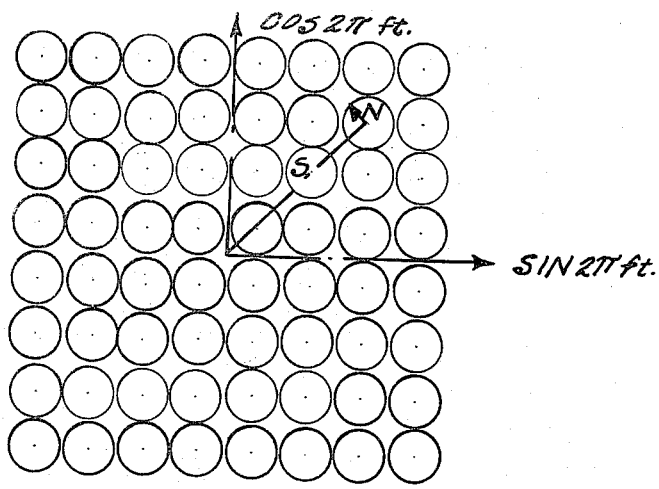
FIG. 6 shows a square amplitude/phase signal space vector matrix as would be generated by two three binary bit words encoded by an orthogonal matrix technique of the first exemplary embodiment.
Figure 7:
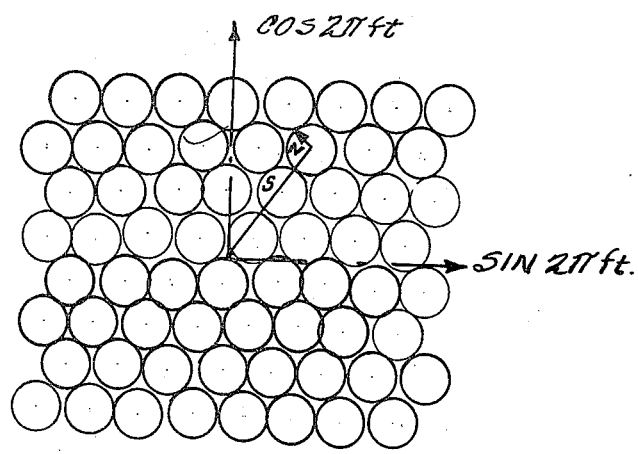
FIG. 7 shows an amplitude/phase signal space vector matrix in accordance with a second embodiment of the invention.
Figure 8:
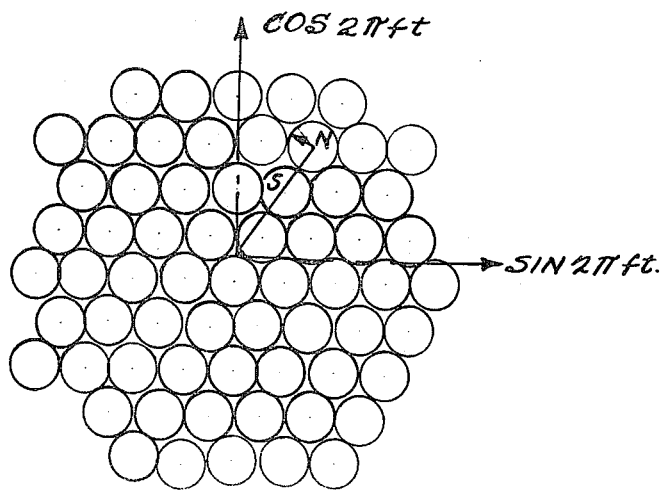
FIG. 8 shows an amplitude/phase signal space vector matrix in accordance with a second form of the second embodiment of the invention.

The preferred system which has been discussed in detail generates a square amplitude/phase signal space vector matrix. FIG. 6 shows the matrix which would be generated if two three binary bit words were encoded by the orthogonal matrix technique just discussed. This represents the space vector matrix at the minimum acceptable signal to noise ratio. FIG. 7 shows the space vector domain for the same matrix when alternate rows are shifted by one half bit and the column gain is reduced by the factor 3/2. FIG. 8 shows the resulting matrix when the bit structure in the space vector distribution of binary bits is subjected to the same transformation as shown in FIG. 7 and in addition are redistributed to form a circle. The power necessary to generate all signals represented by any one of these matrices is proportional to the area of the particular matrix. Thus, FIG. 8 represents the minimum power condition for transmitting a six bit word (two orthogonal three bit words.

Figure 9:
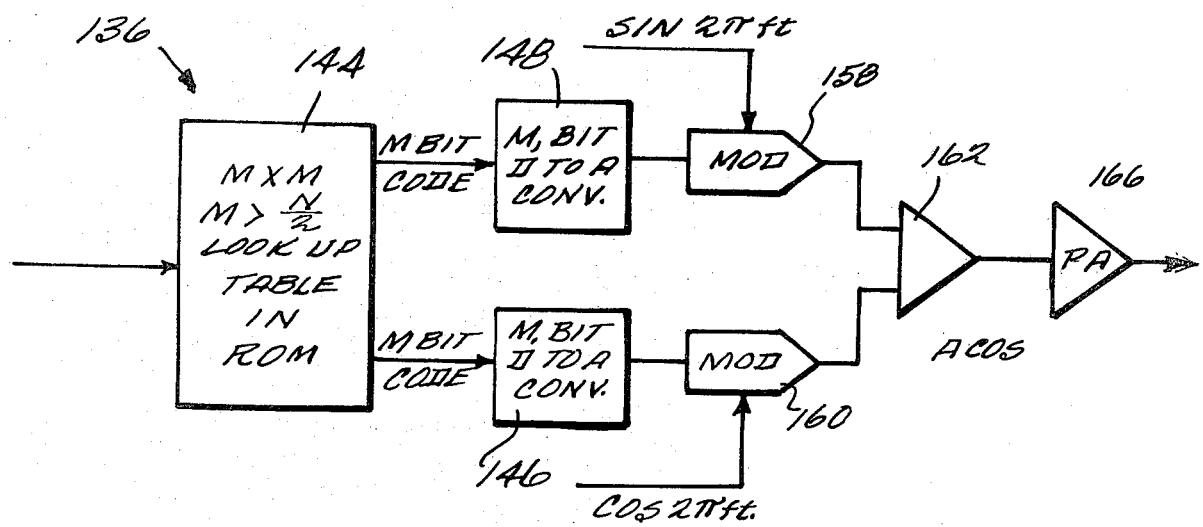
FIG. 9 is a block diagram transmitter in accordance with the second embodiment of the invention.
Figure 10:
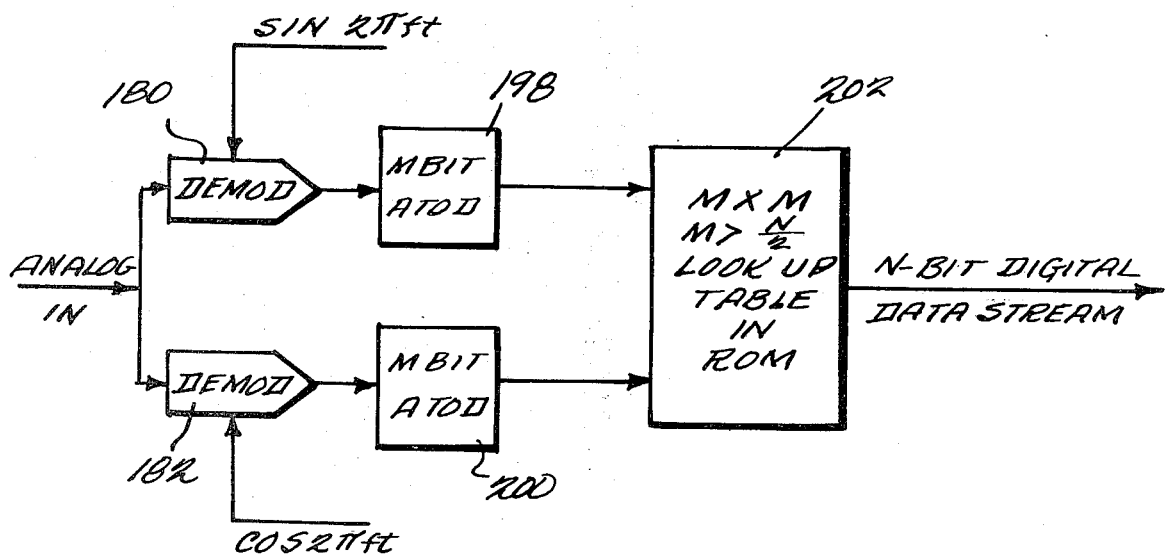
FIG. 10 is a block diagram of a receiver in accordance with the second embodiment of the invention.

This optimized bit transmission density can be achieved by inserting a read only digital memory between the data readout and the digital to analogue converters, as shown in FIGS. 9 and 10. It will be seen that FIGS. 9 and 10 are simplified and generalized versions of the transmitter 16 and receiver 36 diagrammatically illustrated in FIGS. 2 and 4 with read only memory look up table 142 replacing 12 bit shift register 42 in transmitter 16 and read only memory lookup table replacing 194 replacing 12 bit shift register 94 in receiver 36.

Referring to FIG. 9, transmitter 136 includes a read only memory having an M×M lookup table 142 which receives a stream of N-bit digital data, where M is the number of bits required to encode half of the N bits in the digital data stream so that one of the alternate amplitude/phase vector matrices discussed above may be obtained. It will be noted that M will generally be greater than N/2. The read only memory 142 outputs 2 M-bits codes which are respectively inputted to separate M-bit digital to analogue converters 144 and 146 whose outputs respectively modulate cosine and sine carrier signals in modulators 160 and 158 respectively. The outputs of modulators 160 and 158 are then added in amplifier 162 and the resulting signal amplified by power amplifier 166. The output of power amplifier 166 is then transmitted to toroid 18 as has been described with reference to FIG. 1.

Referring to FIG. 10, receiver 136 receives the analogue signal from toroid 26. The analogue signal sine and cosine portions are respectively demodulated by demodulators 180 and 182 and converted to digital form by M-bit analogue to digital converters 198 and 200. The outputs of analogue to digital converters 198 and 200 are inputted to read only memory lookup table 202 whose output is an N-bit digital data stream containing the desired information.

It should be noted that the vector field shown in FIG. 6 constitutes the closest bit packing achievable with a pair of orthogonal three bit signals. However, the configurations of FIGS. 7 and 8 could be approached by using a longer bit configuration in the read only memory. The digital numbers represented by the shorter word input could be allocated to number cells in the larger memory more closely representing the optimum configuration. It should also be noted that there need be no ordered sequence in assigning values to the lookup table in the memory to correspond with the input values. It is only necessary that a corresponding inverse read only memory be inserted in the receiver between the analogue to digital converters and the data output.

The path length and data rate advantage of the invention can best be illustrated by a simple power budget calculation for the second exemplary embodiment of the invention illustrated in FIGS. 7-10 by which the signal penalty for data rates above one cycle per information cycle approaches 3 dB per bit. For purposes of this calculation, assume an electrical current of known amplitude is injected into a drill string. This amplitude is referred to as $I_1$ and the amount of current is in deciBell (dB) notation. The receiving device can receive a threshold signal referred to as $I_2$. The magnitude of $I_2$ depends upon the expected noise level at the receiving site, the signal-to-noise ratio required to receive conventional binary digital data at an acceptable error rate, and the inherent front end noise of the receiver. The difference between $I_1$ and $I_2$ in dB defines the dynamic range, R, of the system, $$I_1 - I_2 = R \text{ dB}.$$

Normal practice allows a safety factor to account for indetermanacies in the system. This is referred to as S. The magnitude of S may be based on engineering judgment, theoretical calculations or actual on site measurement.

The working margin, referred to as W is the difference between R and S, $$W = (R - S) \text{ dB}.$$

The economic advantage of this invention rests in how W, which is the available signal range, is used.

It should be pointed out that for sake of illustration we use the standard skin depth expression to define signal attenuation. Other modes may exist, or the actual attenuation and dispersion factors may be empirically derived. It should also be appreciated that these teachings are not peculiar to the signal on a drill string but are equally applicable to any form of electrical communication path through a conductive, and frequency dispersive medium.

The expression for the exponential signal attenuation in the Wait equation described above, is $e^{-d/\delta}$ nepers/meter which in dB notation reduces to $$A \cong 5.3 D \sqrt{\sigma f} \text{ dB}/1000 \text{ ft}.$$

where
A = the attenuation in dB per thousand feet
D = the path length in thousands of feet
$\sigma$ = the path conductivity in Mhos/meter
f = frequency in Hz
In normal computations the working margin is made equal to A $$A = W$$

Thus, $W = 5.3 D \sqrt{\sigma f}$.

Under these conditions the achievable operating depth or distance for a particular system is $$D = 0.19 W / \sqrt{\sigma f}$$

Thus, for example, for a typical working margin of, say 80 dB with $\sigma = 1$ mho/m and $f = 9$ Hz, D is calculated to be 5067 ft.

It is now necessary to consider the rate at which data can be transmitted. Under conventional binary transmission the maximum data rate is one cycle per bit. In communications channels both data rate and achievable path length are important. For a needed data rate referred to as X, the maximum achievable depth $D_1$ without this invention is $$D_1 = 0.19 W / \sqrt{\sigma X}$$

The use of this invention allows the working margin W to be divided between signal used to achieve data rate and signal to achieve depth. For the preferred case disclosed in these teachings the signal penalty for data rates above one cycle per information cycle approaches approximately 3 dB/bit. The maximum achievable depth is then given by the expression $$D_2 = 0.19(W = 3((X/f) - 1))/\sqrt{\sigma f}$$

$$D_2 = (0.19W - 0.57((X/f) - 1))/\sqrt{\sigma f}$$

If 12 binary bits are to be transmitted in each information unit, as in the exemplary embodiment described above, then f may be reduced by a factor of 12, the ratio of the data rate to frequency is 12 and for a working margin W of 80 dB and the conductivity $\sigma$ of 1 mho/meter, the path length $D_2 = 10,031$ feet, an approximate doubling of the path length possible under conventional binary transmission. Thus, for a fixed data rate the path length can be approximately doubled by using the present invention rather than conventional binary transmission methods. Similarly, for a given path length of say 5000 feet, it can be shown that the same parameters utilized in the above calculation, the data rate can be more than doubled by utilizing the present invention in place of conventional binary transmission methods.

Although only a few embodiments of this invention have been described in detail, those skilled in the art will readily appreciate that there are many ways to modify the disclosed system without materially changing the desired functioning or results. Accordingly, all such modifications are intended to be included within the scope of this invention.

I claim:

1. A telemetry system for electromagnetic communication of input digital data of a first number base between a first and a second point spaced along the length of a borehole on a conductive member disposed in the borehole of a dispersive medium and making contact with the earth comprising:

transmitter means electrically coupled to said conduction member at said first point, for transmitting low frequency, narrow bandwidth electrical signals of a second number base along said member, said transmitter means including means for generating two or more mutually orthogonal carrier frequencies and multi-level modulation means responsive to data values for modulating said two or more carrier frequencies; said electrical signals second number base being higher than said input data first number base; and receiver means electrically coupled to said conductive member at said second point, including demodulation means for receiving said electrical signals.

2. A telemetry system as in claim 1 wherein said modulation means includes means for phase modulating said one or more carrier frequencies.

3. A telemetry system as in claim 1 or claim 2 wherein said modulation means includes means for modulating the amplitude of said one or more carrier frequencies.

4. A telemetry system as in claim 1 wherein said at one or more carrier frequencies includes a frequency approximately equal to 1 Hz.

5. A telemetry system as in claim 1 further comprising toroid means, surrounding said conductive member, for electrically coupling said receiver means and said transmitter means to said conductive member.

6. A telemetry system for electromagnetic communication of input digital data of a first number base between a first location and a second location in a dispersive medium, along an electrical conductive member having a first end and a second end, said conductive member being disposed in said dispersive medium, said conductive member first and second ends being electrically coupled to said dispersion medium, said telemetry system comprising:

transmitter means, electrically coupled to said conductive member at said first location, for transmitting low frequency narrow bandwidth electrical signals along said conductive member, said transmitter means including means for generating two or more mutually orthogonal electrical carrier waves and multi-level modulation means for modulating said two or more carrier waves, said electrical signals having a higher number base than said input data number base; and receiver means, electrically coupled to said conductive member at said second position, including demodulation means, for receiving said electrical signals.

7. A telemetry system as in claim 5 wherein said second position is located in a borehole, said system further comprising sensor means electrically coupled to said transmitter means, for generating said data to be transmitted by said transmitter.

8. A telemetry system as in claim 6 wherein said conductive member includes a drill string.

9. A telemetry system as in claim 7 further comprising
   first toroid means, surrounding said drill stem at said first position and being electrically coupled to said transmitter, for electrically coupling said transmitter to said drill string; and
   a second toroid means, surrounding said drill string at said second position, and being electrically coupled to said receiver, for electrically coupling said drill string to said receiver.

10. A telemetry system as in claim 5 or claim 7 or claim 8 wherein said modulation means includes means for phase modulating said at least one carrier wave.

11. A telemetry system as in claim 9 wherein said modulation means includes means for modulating the amplitude of said at least one carrier wave.

12. A telemetry system as in claim 5 or claim 7 or claim 8 wherein said modulation means includes means for modulating the amplitude of said at least one carrier wave.

13. A method of communicating between a first location and a second location along a conductive member in a borehole of a dispersive medium comprising the steps of:

(1) sensing a condition at a first location;
   (2) generating digital data values indicative of the sensed condition to obtain a measured value;
   (3) generating at least two low frequency narrow bandwidth mutually orthogonal electrical carrier waves;
   (4) modulating said at least two carrier waves by a narrow bandwidth electrical signal which is indicative of said digital data values; the number base of said electrical signal being higher than the number base of said digital data values;
   (5) transmitting said electrical signal along said conductive member to said second position;
   (6) receiving said electrical signal at said second position; and
   (7) demodulating said signal after it is received at said second position.

14. A method of communicating a digital data value between a first location and a second location along a conductive member surrounded by a dispersive medium comprising the steps of:

(1) generating two or more low frequency narrow bandwidth orthogonal electrical carrier waves at said first location;

(2) modulating said at least two carrier waves by multilevel modulation which modulation represents said data value to obtain a low frequency narrow bandwidth electrical signal representative of said data value, the number base of said signal being higher than the number base of said data value;

(3) transmitting said electrical signal along said conductive member to said second position;

(4) receiving said electrical signal from said second position; and (5) demodulating said signal after it is received from said second position.

15. A method as in claim 14 wherein said step of modulating includes the step of modulating the amplitude of said at least one carrier wave.

16. A method as in claim 14 or claim 15 wherein said step of modulating includes the step of modulating the phase of said at least one carrier wave.

17. A method as in claim 14 wherein the step of transmitting includes the step of transmitting said electrical signal along a drill string located in a borehole.

18. A digital telemetry system for communicating digital data between spaced apart first and second locations along the length of an elongated borehole extending into the dispersive medium of the earth and containing an elongated conductive member therewithin, said system comprising:

an electromagnetic signal transmitter adapted for disposition at said first location for transmitting low frequency, narrow bandwidth electromagnetic signals from said first location to said second location;

said signal transmitter including (a) digital data formatting means adapted to receive input binary-valued bit representing signals and to provide two groups of multiple-valued multiple-bit representing digital data signals corresponding thereto, (b) first digital-to-analog conversion means connected to receive a first group of said multiple-valued multiple-bit representing digital data signals and to produce a first analog output signal uniquely representative thereof, (c) second digital-to-analog conversion means connected to receive a second group of said multiple-valued multiple-bit representing digital data signals and to produce a second analog output signal uniquely representative thereof, (d) carrier signal generation means for generating two mutually orthogonal carrier frequency signals, (e) first modulation means for modulating one of said carrier frequency signals by said first analog output signal, thus producing a first modulated carrier signal, (f) second modulation means for modulating the other one of said carrier frequency signals by said second analog output signal thus producing a second modulated carrier signal, and (g) combined transmitter driving means connected to combine said first and second modulated carrier signals into a single low frequency, narrow bandwidth electrical signal for generating said electromagnetic signals; and an electromagnetic signal receiver means adapted for disposition at said second location for receiving said electromagnetic signals including means for converting them into two demodulated analog signals, means for converting such analog signals into two corresponding groups of multiple-valued multiple-bit representing digital data signals and means for combining such groups into binary-valued bit-representing digital data signals substantially identical in data value to those originally received by said signal transmitter.

19. A digital telemetry system as in claim 18 wherein said digital data formatting means comprises a 2n-bit shift register which accepts a stream of bit serial binary-valued input signals and provides two parallel groups of parallel n-bit output signals, each group having $2^n$ possible digital values.

20. A digital telemetry system as in claim 18 wherein said digital data formatting means comprises a ROM look-up table.

21. A digital telemetry system as in claim 18, 19 or 20 wherein said modulation and demodulation means includes both phase and amplitude modulation and demodulation devices.

22. A digital telemetry system as in claim 21 wherein said carrier signal generation means produces sine and cosine shaped signals at a single carrier frequency.

23. A signal transmitter for use in communicating electromagnetic signals between spaced apart first and second locations along the length of an elongated borehole extending into the dispersive medium of the earth and containing an elongated conductive member therein, said transmitter comprising:

(a) digital data formatting means adapted to receive input binary-valued bit representing signals and to provide two groups of multiple-valued multiple-bit representing digital data signals corresponding thereto, (b) first digital-to-analog conversion means connected to receive a first group of said multiple-valued multiple-bit representing digital data signals and to produce a first analog output signal uniquely representative thereof, (c) second digital-to-analog conversion means connected to receive a second group of said multiple-valued multiple-bit representing digital data signals and to produce a second analog output signal uniquely representative thereof, (d) carrier signal generation means for generating two mutually orthogonal carrier frequency signals, (e) first modulation means for modulating one of said carrier frequency signals by said first analog output signal, thus producing a first modulated carrier signal, (f) second modulation means for modulating the other one of said carrier frequency signals by said second analog output signal thus producing a second modulated carrier signal, and (g) combined transmitter driving means connected to combine said first and second modulated carrier signals into a single low frequency, narrow bandwidth electrical signal for generating said electromagnetic signals.

24. A signal transmitter as in claim 23 wherein said digital data formatting means comprises a 2n-bit shift register which accepts a stream of bit serial binary-valued input signals and provides two parallel groups of parallel n-bit output signals, each group having $2^n$ possible digital values.

25. A signal transmitter as in claim 23 wherein said digital data formatting means comprises a ROM look-up table.

26. A signal transmitter as in claim 23, 24 or 25 wherein said modulation means includes both phase and amplitude modulation devices.

27. A signal receiver for use in communicating electromagnetic signals between spaced-apart first and second locations along the length of an elongated borehole extending into the dispersive medium of the earth and containing an elongated conductive member therein, said receiver comprising:

electromagnetic signal receiving means for receiving said electromagnetic signals and for converting them into two demodulated analog signals derived from two orthogonal carrier frequency signals, two analog-to-digital conversion means for converting said demodulated analog signals into two corresponding groups of multiple-valued multiple-bit representing digital data signals, and means to combine said groups into binary-valued bit-representing digital data signals.

28. A signal receiver as in claim 27 wherein said demodulation means includes both phase and amplitude demodulation devices.

* * * * *